US008054567B2

(12) United States Patent
Mochizuki et al.

(10) Patent No.: US 8,054,567 B2
(45) Date of Patent: Nov. 8, 2011

(54) METHOD FOR MEASURING WRITE/READ WIDTH OF A COMPOSITE MAGNETIC HEAD AND A MEASURING DEVICE USING THE METHOD

(75) Inventors: Hideki Mochizuki, Kodama-gun (JP); Yoshihiro Sakurai, Kodama-gun (JP); Toshiaki Suzuki, Kodama-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 72 days.

(21) Appl. No.: 12/506,571

(22) Filed: Jul. 21, 2009

(65) Prior Publication Data
US 2010/0020428 A1 Jan. 28, 2010

(30) Foreign Application Priority Data
Jul. 23, 2008 (JP) .................................. 2008-189866

(51) Int. Cl.
*G11B 27/36* (2006.01)
*G11B 21/02* (2006.01)
(52) U.S. Cl. ........................................ 360/31; 360/75
(58) Field of Classification Search .................... None
See application file for complete search history.

(56) References Cited

U.S. PATENT DOCUMENTS

| 6,894,489 | B2 * | 5/2005 | Makuuchi et al. ............ 324/212 |
| 7,035,039 | B2 * | 4/2006 | Shitara et al. .............. 360/77.07 |
| 2008/0198501 | A1 * | 8/2008 | Kawabe ..................... 360/77.06 |
| 2009/0323209 | A1 * | 12/2009 | Kiyono ......................... 360/31 |

FOREIGN PATENT DOCUMENTS

| JP | 2000-231707 A | 8/2000 |
| JP | 2007-012119 A | 1/2007 |
| JP | 2007-149155 A | 6/2007 |

* cited by examiner

*Primary Examiner* — Daniell L Negron
*Assistant Examiner* — Regina N Holder
(74) *Attorney, Agent, or Firm* — Mattingly & Malur, PC

(57) ABSTRACT

Test data is written in tracks of a discrete track medium by making the tracks eccentric by accessing a plurality of tracks by forcibly making a composite magnetic head eccentric under an ON track servo control. The test data written in the tracks which are pseudo-eccentric are written in the tracks with the original write sensitive width of a write head. It is possible to obtain a read characteristics profile having a peak by tracing and reading the test data while moving the composite magnetic head (read head) which is forcibly made eccentric in a radial direction.

14 Claims, 5 Drawing Sheets

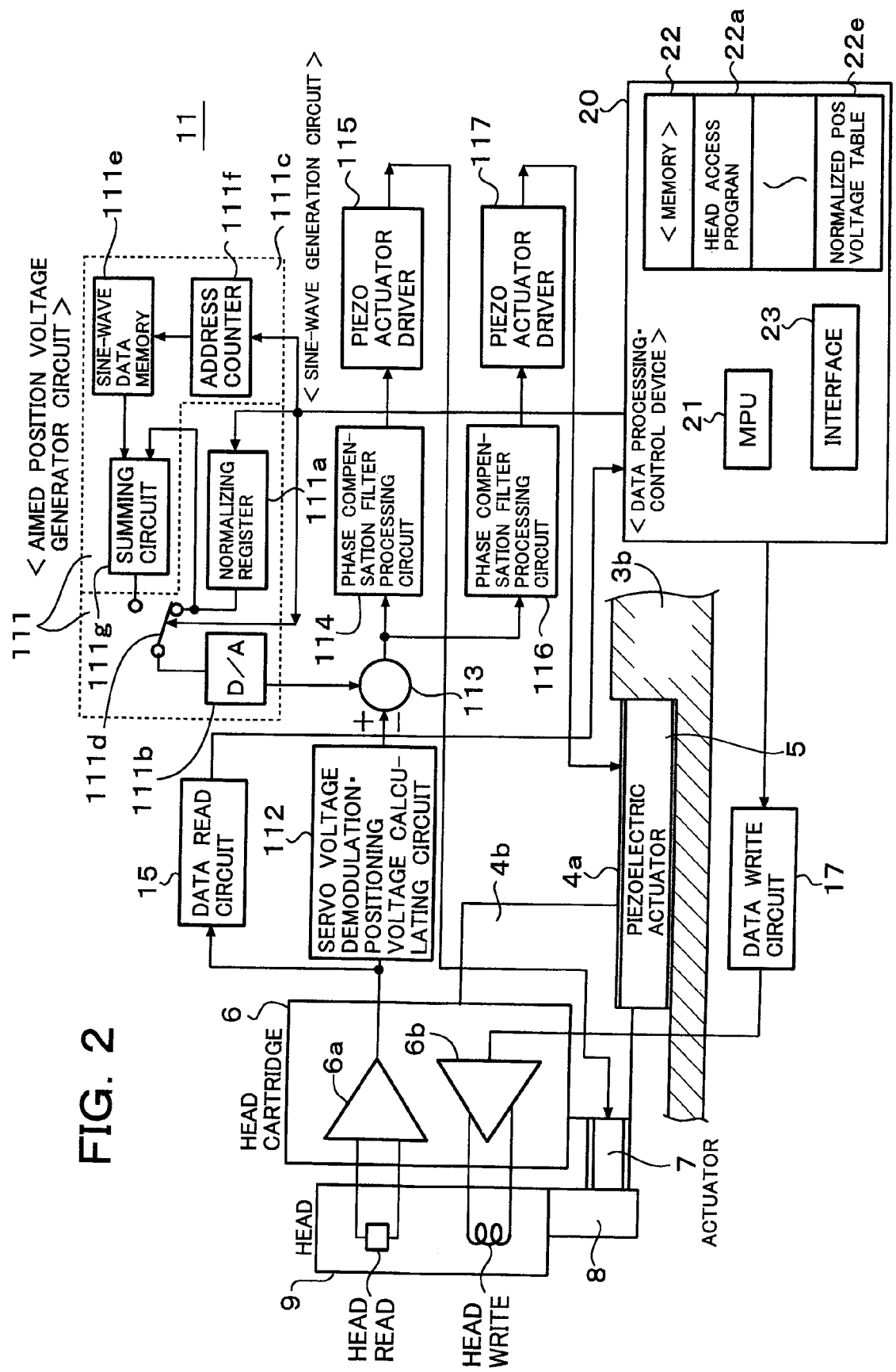

METHOD FOR MEASURING WRITE/READ WIDTH OF A COMPOSITE MAGNETIC HEAD AND A MEASURING DEVICE USING THE METHOD

TECHNICAL FIELD

This invention relates to a method for measuring write/read width of a composite magnetic head and a measuring device for the method. In detail, in a composite magnetic head composed of an MR (magnetic resistance effect) head and a thin film inductive head (write head), this invention relates to a method for easily measuring write/read width of the write head and a read sensitive width of an MR head (read head) by reading and writing data in the composite magnetic head (discrete track medium (DTM)) of a discrete track system having track width narrower than a write sensitive width of the thin film inductive head.

BACKGROUND ART

The hard disk (HDD) for a disk of 3.5 to 1.8 inches or even 1.0 inch or less has been used in various fields of automobile products, home electrical appliances and audio appliances, etc. Therefore, the reduction of cast of hard disk drive and the mass production thereof have been requested and the large memory capacity thereof has been also requested.

In order to satisfy these requests, there is a tendency that the high density recording magnetic disk media of the vertical magnetic memory system, which has lately been put to practical use, has been employed in the above mentioned fields and spread rapidly.

The magnetic disk medium of the vertical magnetic memory system is used in a composite magnetic head having a TMR (tunnel magneto-resistance) head or a GMR (giant magneto-resistance) head, which is a memory medium separable from the head by 10 nanometer or less controllably.

Such magnetic disk medium generally includes a glass substrate, a soft magnetic layer formed on the glass substrate and a magnetic layer provided on the soft magnetic layer. Discrete tracks are formed in a discrete substrate by etching the magnetic layer. (Incidentally, the term "disk substrate" is used as a material of a magnetic disk to be mounted on a hard disk drive.)

The etching for forming grooves between tracks is performed through an uneven photo-resist film. The unevenness of the photo-resist film is formed by using the nano-print lithography and pushing the photo-resist film with an uneven stamper. The track width of the discrete track formed by the dry etching through the uneven photo-resist is 100 nm or less and the groove separating adjacent tracks is filled with a non-magnetic material in a later step.

Such technique is described in JP-2007-012119A and JP-2007-149155A, etc., and is well known.

The magnetic disk of this kind is called as a magnetic recording medium of the discrete track system (DTM) and is currently paid attention to a technique capable of realizing ultra high density recording exceeding 1 terabit/(inch)$^2$ for 2.5 inches several years later. Further, the bit patterned medium (BPM) having discrete tracks, which are finely separated magnetically in the track direction, has been entered into the practical implementation step recently.

Since a magnetic film of the prior art magnetic disk used in HDD is formed on the whole surface of the medium, the prior art magnetic disk is easily possible to record test data (test burst signal) in arbitrary track by a write head. Therefore, the read voltage characteristics, that is, the read characteristics profile (waveform), with respect to the moving distance of the read head crossing the track can be obtained easily by reading test data recorded in the track while moving the read head continuously in radial direction of the disk. With the profile of the read characteristics, the write sensitive width of the write head and the read sensitive width of the read head can easily be measured as the characteristics parameter of the composite magnetic head in the magnetic head test and, therefore, the composite magnetic head can be evaluated or tested.

FIG. 7 explains a prior art measuring method for measuring a write sensitive width of a write head and a read sensitive width of a read head as characteristics parameters of a magnetic head.

In FIG. 7, it is assumed that a write of test data in a designated track with write sensitive width Wa by a composite magnetic head (write head) has been complete already. In a read step of the test data, the test data is read by moving the composite magnetic head (read head) rightward in the drawing along a radial direction of the disk across the designated track.

In a position (1) shown in FIG. 7, a right side end of a read sensitive width Wb of an MR head (read head) corresponds to a left sided of the write sensitive width Wa of the test data. At this time, a gap (center line Cb) of the MR head can read the test data (the left side end thereof) written by the write head. In this case, the read voltage is still 0 (zero).

In order to simplify the description, the unit of the read voltage of the MR head is no [mV] but a ratio in a range between numerical value "0" and numerical value "1" under a maximum read voltage of the test data being 1. Incidentally, each of the sensitive widths Wa and Wb of the heads is determined by the gap width of the heads. The write sensitive width Wa of the write head (thin film inductive head) was usually in the order of several µm. In the DTM, the write sensitive width of the write head is in the order of 50 nm to 80 nm and the track width is 50 nm or less. Further, when the DTM rotates, the formed track is eccentric. Therefore, even if the write sensitive width of the write head is close to the track width substantially, there is a problem that the track width becomes narrower than the write sensitive width of the write head in the data recording state.

At a position (2), the read sensitive width Wb of the MR head enters into the side of the write sensitive width Wa by Wb/2. Therefore, Wb/2 of the right side of the read sensitive width Wb becomes on the write sensitive width Wa. In this state, the read voltage becomes 0.5 when the test data is written uniformly. When the MR head is moved rightward further to the a position (3), the read sensitive width WB overlaps the write sensitive width WA completely. Therefore, the maximum read voltage becomes 1.0. When Wa>Wb, the voltage in the width range (Wa-Wb) becomes 1.0 evenly and the read voltage becomes flat. Therefore, when MR head is at a position (4), the read voltage is 1.0. As a result, it is possible to obtain the profile (waveform) of the read voltage characteristics having a center flat portion as shown by a thick solid line. Incidentally, the head parameter measuring method of this kind is described in JP-2000-231707A and known publicly.

On the basis of the read voltage characteristics profile (waveform), the write sensitive width Wa and the read sensitive width Wb and an offset amount Δx between a read head and a write head of a composite magnetic head can be measured as head parameters.

In a usual DTM, a center of the DTM with respect to a rotation center of a spindle and a center of a discrete track formed with respect to the center of the DTM are eccentric. Therefore, unless these eccentricities are corrected stepwise, the track formed with respect to the rotation center of the spindle is eccentric. Therefore, it is impossible to trace the track by the composite magnetic head unless the ON track servo control is performed.

However, even when the magnetic head (read head) is moved in a radial direction at a designated speed under ON track servo control, the read head can not pass the whole write area which is determined by the write sensitive width when the track width become narrower than the write sensitive width Wa of a write head as in the DTM. Therefore, there is the problem that the profile of the read voltage characteristics shown in FIG. 7 can not be obtained. Further, since the read sensitive width of the read head in the DTM becomes close the track width, it is impossible to obtain the profile having the center flat portion as shown in FIG. 7. Therefore, it becomes difficult to measure the write sensitive width of the write head or the read sensitive width of the read head.

SUMMARY OF THE INVENTION

An object of this invention is to provide a write/read width measuring method of a composite magnetic head with which a write sensitive width of a write head or a read sensitive width of a read head can easily be measured by reading and writing data with respect to a DTM, etc., having a track width of which is narrower than the write sensitive width of the write head and a measuring device therefor.

In order to achieve this object, the write/read width measuring method of the composite magnetic head or the measuring device therefor comprises the steps of writing test data over at least two tracks corresponding to an eccentricity by the write head by positioning the composite magnetic head under an ON track servo control for ON-tracking by reading a servo information from a designated track of a magnetic recording medium of such as DTM, BPM or other rotating magnetic recording medium having uneven recording layer and driving the composite magnetic head such that the eccentricity for accessing at least two tracks for one revolution is added in the radial direction of the composite magnetic head, reading the test data written in the at least two tracks by the read head correspondingly to a moving position in the radial direction by moving the composite magnetic head in the radial direction from a front of the designated track to a behind of the designated track or vice versa, and calculating the write sensitive width or the read sensitive width by obtaining a read characteristics profile having a peak of a read voltage for the moving distance of the composite magnetic head in the radial direction on the basis of the read signal of the read head.

In this invention, the test data is written in the DTM with the tracks being pseudo-eccentric by positioning the composite magnetic head in the designated track under ON track servo control and accessing a plurality of tracks by forcibly making the tracks pseudo-eccentric. In this case, the test data written in the tracks have a write sensitive width. Therefore, it is possible to obtain a read characteristics profile having a peak by reading the test data written in the tracks by tracing the read voltage characteristics while moving the composite magnetic head (read head) in the radial direction.

It is possible to make the read characteristics profile as a read characteristics approximate profile having a flat portion by obtaining approximate liner lines in both sides of the read characteristics profile from curved lines in the both sides. It is also possible to obtain the sensitive widths of the read head and the write head on the basis of the read characteristics approximate profile. Further, it is possible to obtain the sensitive width of the write head in the latter read characteristics profile.

As a result, it is possible to measure the write sensitive width of the write head and the read sensitive width of the read head even by the DTM and the BTM in which the track width is narrower than the write sensitive width of the write head.

BRIEF DESCRIPTION OF THE DRAWINGS

FIG. 2 is a servo positioning control circuit for driving a head eccentrically.

DESCRIPTION OF THE PREFERRED EMBODIMENT

Figure 1:
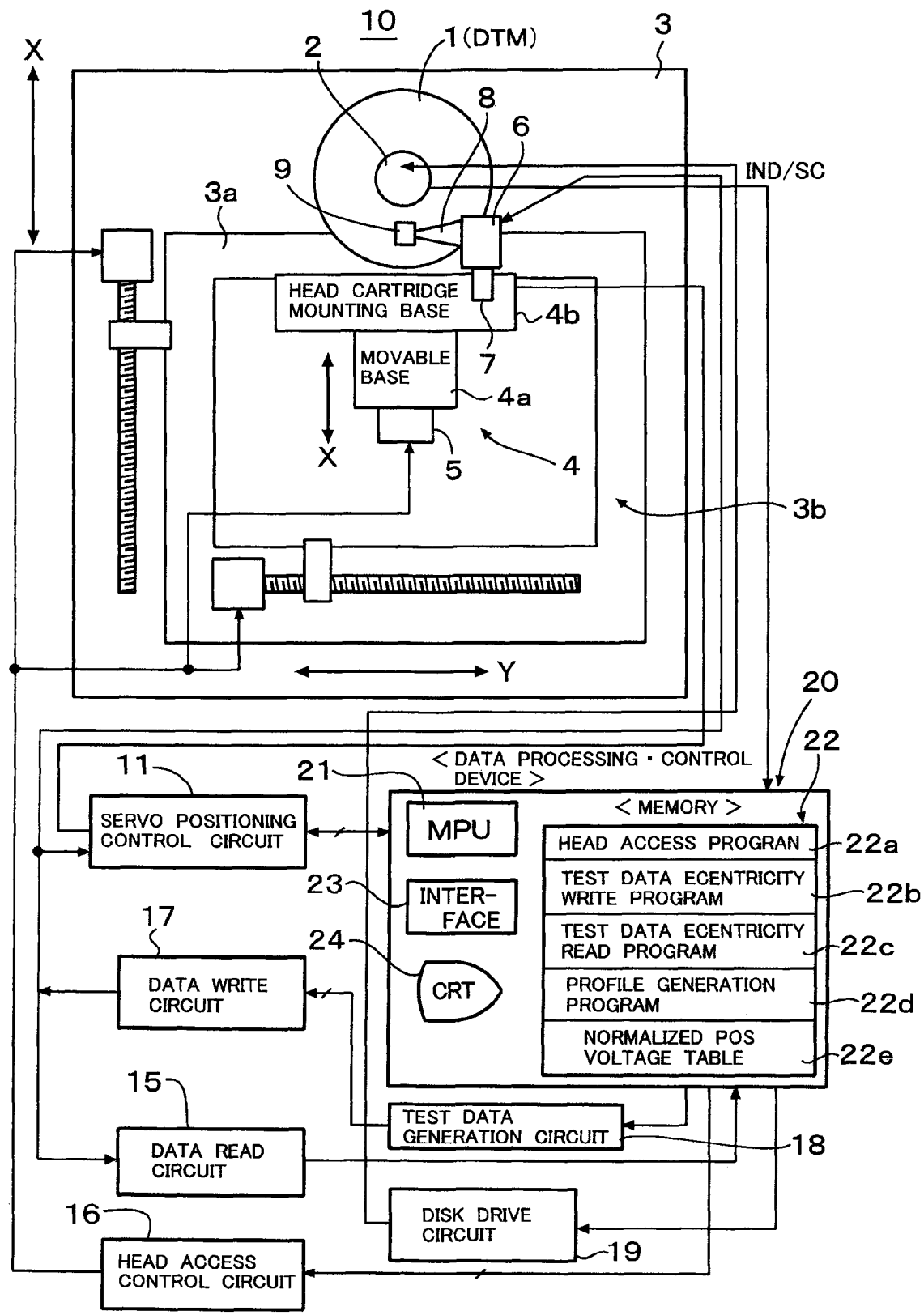
FIG. 1 is a block diagram of a write/read width measuring device of an MR composite magnetic head according to an embodiment of this invention.

In FIG. 1, a reference numeral 10 depicts a magnetic head tester and a reference numeral 1 depicts a DTM (discrete track medium) which is mounted on a spindle 2 detachably. An XY stage 3 as a head carriage is provided adjacent to the spindle 2. The XY stage 3 is composed of an X stage 3a and a Y stage 3b.

Incidentally, the DTM 1 is a disk whose discrete tracks are eccentric with respect to a rotation center of the spindle 2 when it is mounted on the spindle 2. In a usual DTM, a center of the DTM is eccentric with respect to a rotation center of a spindle 2 and a center of discrete tracks formed in the DTM are eccentric with respect to the center of the DTM. Therefore, the tracks formed in the disk become eccentric with respect to the rotation center of the spindle unless the eccentricity is corrected stepwise. For this reason, it can be said that 2 tracks or more become eccentric in the DTM 1 mounted on the spindle 2.

As a result, an ON track servo control (to be described later) is necessary.

The X stage 3a is movable in a radial direction of the DTM 1 so that a piezoelectric stage 4 on which a composite magnetic head 9 which has the MR head (read head) and the thin film inductive head (write head) and is an object to be tested is mounted is movable in the radial direction of the DTM 1 through the Y stage 3b.

The Y stage 3b is mounted on the X stage 3a for moving the head 9 for a skew regulation with respect to the head 9. The piezoelectric stage 4 for finely regulating a position of the head 9 in X direction is mounted on the Y stage 3b.

The piezoelectric stage 4 is composed of a movable base 4a, a had cartridge mounting base 4b and a piezoelectric actuator 5. The head cartridge mounting base 4b is connected to a top side of the movable base 4a. The movable base 4a is mounted on the Y stage 3b through the piezoelectric actuator 5 to move the head cartridge mounting base 4b along X axis.

Thus, when the piezoelectric actuator 5 is driven, the head cartridge mounting base 4b moves in X direction and the fine regulation of the head position in the radial direction of the DTM 1 is performed through a head cartridge 6. Incidentally, the X direction is coincident to a radial direction passing through the center of the DTM 1.

The head cartridge 6 is mounted on the head cartridge mounting base 4b through the piezoelectric actuator 7 and a suspension spring 8 is fixed onto the head cartridge 6. The piezoelectric actuator 7 may be mounted inside of the head cartridge 6. In such case, the piezoelectric actuator is mounted between the suspension spring 8 and a head mounting base of the suspension spring 8 of the head cartridge 6 in such a way that the head 9 can be moved radially through the suspension spring 8. Since, in this case, the mass to be driven by the piezoelectric actuator 7 becomes small, it is possible to improve the responsibility of the ON track servo control.

The head 9 is mounted on a top end side of the suspension spring 8. The head 9 performs the so-called head access operation for reading data from one of the tracks of the DTM 1 or writing data in the track by moving the head 9 radially along the X axis direction of the DTM 1 to scan the tracks of the DTM 1 and positioning the head 9 in the track.

The head cartridge 6 mounts the head 9 on a head carriage detachably and includes a read amplifier and a write amplifier therein. The read amplifier receives a read signal from the MR head, amplifies the read signal and outputs the amplified signal to a data read circuit 15 and a servo positioning control circuit 11.

The servo positioning control circuit 11 reads a servo information provided correspondingly to a sector and performs an ON track servo control such that the composite magnetic head 9 becomes an ON track state in the positioned aimed track correspondingly to the servo information. As shown in FIG. 2, the servo positioning control circuit 11 is composed of an aimed position voltage generator circuit 111, a servo voltage demodulation•positioning voltage calculating circuit 112, an error voltage generator circuit 113, a phase compensation filter processing circuit 114 for the piezo actuator 7 on the cartridge side, a piezo actuator driver 115, a phase compensating filter processing circuit 116 for the piezo actuator 5 on the side of a piezo stage 4 and a piezo actuator driver 117.

Incidentally, the servo information is usually composed of a 4-phase burst signal having A phase, B phase, C phase and D phase which are sequentially separated by W/4 each other in the radial direction of a track having width of W.

A data read circuit 15 receives a read signal of the MR head from a read amplifier provided in the head cartridge 6, binarizes the read signal and sends the designated signal to a data processing•control device 20. A reference numeral 16 depicts a head access control circuit. The head access control circuit 16 receives a control signal from the data processing•control device 20 to drive the XY stage 3 and the piezoelectric actuator 5 to thereby position the head 9 in a designated track. A reference numeral 17 depicts a data write circuit and a reference numeral 18 depicts a test data generation circuit. The test data generation circuit 18 generates a designated test data under control of the data processing•control device 20 and sends the test data to the data write circuit 17. The data write circuit 17 generates a write signal according to the test data, drives a write amplifier 6b (refer to FIG. 2) provided in the head cartridge 6 and writes the data in a designated track through the thin film inductive head of the head 9.

Incidentally, a reference numeral 19 depicts a disk drive circuit and the head access control circuit 16 and the XY stage 3 as the head carriage construct a positioning mechanism of the composite magnetic head of this invention.

Figure 4:
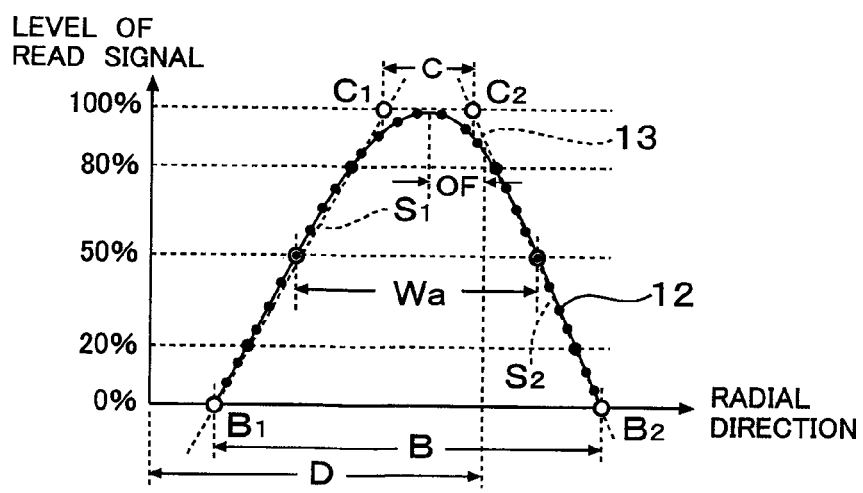
FIG. 4 shows a measured read characteristics profile and an approximate read characteristics profile corresponding to a conventional magnetic head.

FIG. 4 shows about one forth section of the DTM 1 to explain the portion of the DTM, which is accessed by a magnetic head to be tested.

Servo areas 1a corresponding to respective sectors are provided in the DTM 1. In the servo area 1a, track position information, servo information (servo burst signal) for determining ON track position and a sector number, etc., are recorded. Following the servo areas, discrete tracks 1b are formed, respectively, and an area between the adjacent discrete tracks 1b is filled with a no-magnetic member 1c.

The discrete tracks 1b constitute a data area 1e in which the test data, etc., is written. The width of the discrete track 1b is in the order of 50 nm to 60 nm. The write sensitive width Wa of the head 9 is 60 nm or more at present.

Returning to FIG. 1, the data processing•control device 20 is constructed with an MPU 21, a memory 22, an interface 23, a CRT display 24 and a key board, etc., and these components are mutually connected by a bus.

In the memory 22, a head access program 22a, a test data eccentricity write program 22b, a test data eccentricity read program 22c, a profile generation program 22d approximating the read characteristics and a normalized POS voltage table 22e, etc., are stored.

Incidentally, when the MPU 21 executes the test data eccentricity write program 22b and the test data eccentricity write program 22c, the composite magnetic head 9 is under the ON track servo control.

FIG. 2 shows the servo positioning control circuit 11 for eccentrically driving the head.

The aimed position voltage generator circuit 111 of the servo positioning control circuit 11 includes a normalizing register 111a, a D/A conversion circuit (D/A) 111b, a sine wave data generation circuit 111c and a switching circuit 111d.

The sine-wave generation circuit 111c is constructed with a sine-wave data memory (ROM) 111e, an address counter 111f and a summing circuit 111g.

Usually, the switching circuit 111d connects the normalizing register 111a to the D/A conversion circuit (D/A) 111b for the ON servo control and the data processing•control device 20 sets an aimed value data for positioning the head 9 in the normalizing value register 111a. The D/A 111b converts the aimed value data to generate a voltage value (aimed position voltage value) corresponding to the aimed track as an analog conversion voltage value. The aimed position voltage value is outputted from the aimed position voltage generator circuit 111 to the error voltage generator circuit 113 to perform the ON track servo control of the head 9.

The servo voltage demodulation•position voltage calculation circuit 112 is constructed with a DSP (digital signal processor) and receives the servo signal (servo burst signal) read out from the read amplifier 6a of the head cartridge 6 and calculates a position voltage corresponding to the track position.

In general, there are 10,000 tracks or more in about 1024/n sectors where n is an integer of 1 or more. For example, the MPU 21 roughly positions the head 9 in the tracks every ten tracks and by the X stage 3a and the piezo stage 4 finely positions the head 9 for forward 5 tracks and rearward 5 tracks with the roughly positioned track as a center. The servo information in this case includes 4-phase or 6-phase servo burst signals correspondingly to the respective tracks.

In a case where 10 tracks are supposed as one unit and there are 10 servo signals A to J, the servo voltage demodulation•position voltage calculator circuit 112 calculates the position voltage signal PV by DSP, for example, the following equation.

$$PV=\{(Va-Vj)+0.75*(Vb-Vh)+0.5*(Vc-Vg)+0.25*(Vd-Vf)\}/(Va+Vb+Vc+Vd+Ve+Vf+Vg+Vh+Vi+Vj)$$

where Va to Vj are detected voltage signals in the tracks a to j, respectively. Amplitude levels of the servo burst signals in the respective track positions which are obtained from the read amplifier 6a are obtained as voltage values Vi (i=a to j) with the detection voltage signals in the tracks with every 10 tracks as a reference. The normalizing POS voltages (detection voltage) PV corresponding to the track positions can be obtained by substituting the voltage values Vi in the above mentioned equation with using the DSP.

On the other hand, the normalizing POS voltage values for the aimed positioning are stored in the memory 22 of the data processing•control device 20 as a normalizing POS voltage table 22e.

Therefore, the MPU 21 sets the data for the ON track servo positioning on the aimed tracks which are obtained by referencing the normalizing POS voltage table 22e in the normalizing value register 111a. The D/A 111b generates the normalizing POS voltage by D/A-converting this data and sends the normalizing POS voltage to the error voltage generator circuit 113.

The error voltage generator circuit 113 receives the normalizing POS voltage obtained from the normalizing POS voltage table 22e as an instruction voltage and generates an error signal correspondingly to a difference between the voltage value of the instruction voltage and the voltage corresponding to the aimed track position which is a positioning target outputted from the aimed position voltage generator circuit 111. Thus, the error voltage generator circuit 113 generates a voltage signal corresponding to a difference between the aimed voltage value and a voltage value of a current position obtained from the servo voltage demodulation•position voltage calculation circuit 112 and the aimed track position, as an error signal.

The error signal of the error voltage generator circuit 113 is inputted to phase compensation filtering processing circuits 114 and 116. The phase compensation filtering processing circuit 114 and the phase compensation filtering processing circuit 116 are servo filtering processing circuits for setting the head in ON track state under a stable servo control at high speed with respect to a head position error and obtain a dynamic range which is necessary for the head position correction under the ON track servo control. These servo filtering processing circuits are constructed with DSPs (digital signal processors) and have different filtering frequency bands.

After the error voltage signal is phase-compensated by the phase compensation filtering circuit 116, the error voltage signal is inputted to a piezo actuator driver 117 of 100 dB or more and the piezo actuator driver 117 drives the piezo actuator 5. Therefore, the head cartridge 6 is moved to control the head 9 such that the head 9 is positioned in a center of a track at a low response speed.

After the error voltage signal is phase-compensated by the phase compensation filtering circuit 114, the error voltage signal is inputted to a piezo actuator driver 115 of 100 dB or more and the piezo actuator driver 115 drives the piezo actuator 7. Therefore, the head 9 is moved in the radial direction and controlled such that the head 9 becomes the ON track state with high speed response.

Now, an operation for making the tracks pseudo-eccentric with respect to a head by forcibly driving a head eccentrically in the ON track servo control will be described. The switching circuit 111d connects the sine wave data generator circuit 111c to the D/A 111b in response to a switching signal from the date processing•control device 20. Upon this, the head 9 is eccentrically driven to the aimed track under the ON track servo control.

The sine wave data memory 111e of the sine wave data generator circuit 111c, which is accessed when the address counter 111f is incremented by the data processing•control device 20, generates one sine-wave data for one revolution of a disk when the address of the sine data memory 111e takes a revolution. The data of this sine-wave is added to the summing circuit 111g. The summing circuit 111g receives the sine-wave data from the normalizing register 111a and outputs a data, which is a sum of the sine-wave data and a data set in the normalized value register 111a, to the D/A 111b. As a result, the sine-wave data having a designated amplitude, generated one for one revolution of the disk and including waveforms on a positive pole side and a negative pole side with the data position set in the normalizing value register 111a as a reference is generated.

The voltage signal D/A converted by the D/A 111b is supplied to the error voltage generator circuit 113. As a result, the piezo actuator driver 115 drives the piezo actuator 7 or the piezo actuator driver 117 drives the piezo actuator 5 at low speed to eccentrically drive the head 9 with respect to the aimed track under the ON track servo control.

Incidentally, the construction of the sine-wave data memory 111e is not limited to ROM construction. It may have a construction in which the sine-wave data having an amplitude corresponding to an amount of difference from a track of the head 9 to be made eccentric is calculated by the data processing•control device 20 and preliminarily loaded in an RAM.

Figure 5:
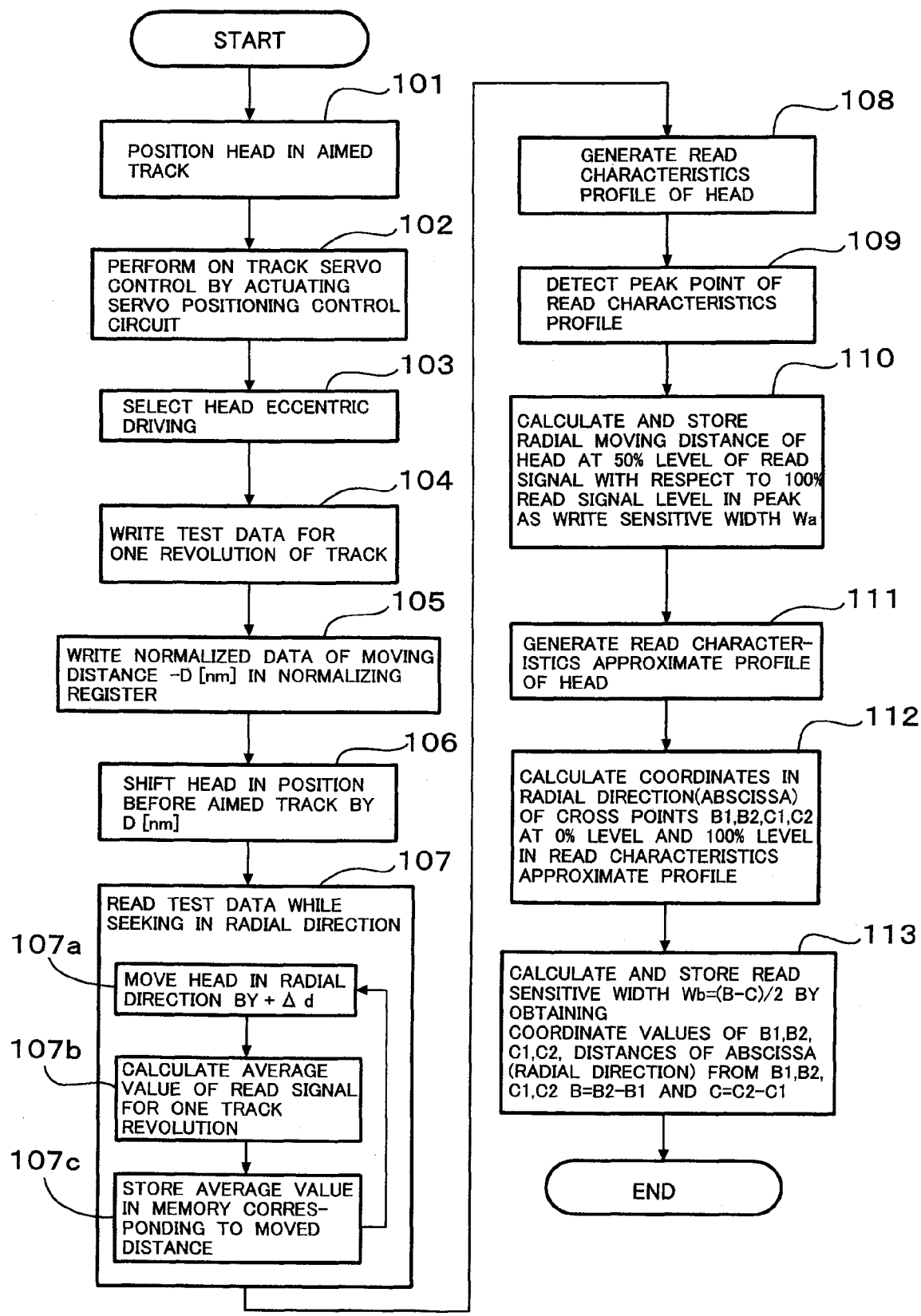
FIG. 5 is a flowchart of a read characteristics profile processing of a test magnetic head.

FIG. 5 is a flowchart of the read characteristics measuring processing of the test magnetic head.

The MPU 21 drives the head access control circuit 16 by executing the head access program 22a to activate the head access control circuit 16 by setting a moving distance r [mm] in radial direction in a designated register of the head access control circuit 16 through the interface 23.

Figure 3A:
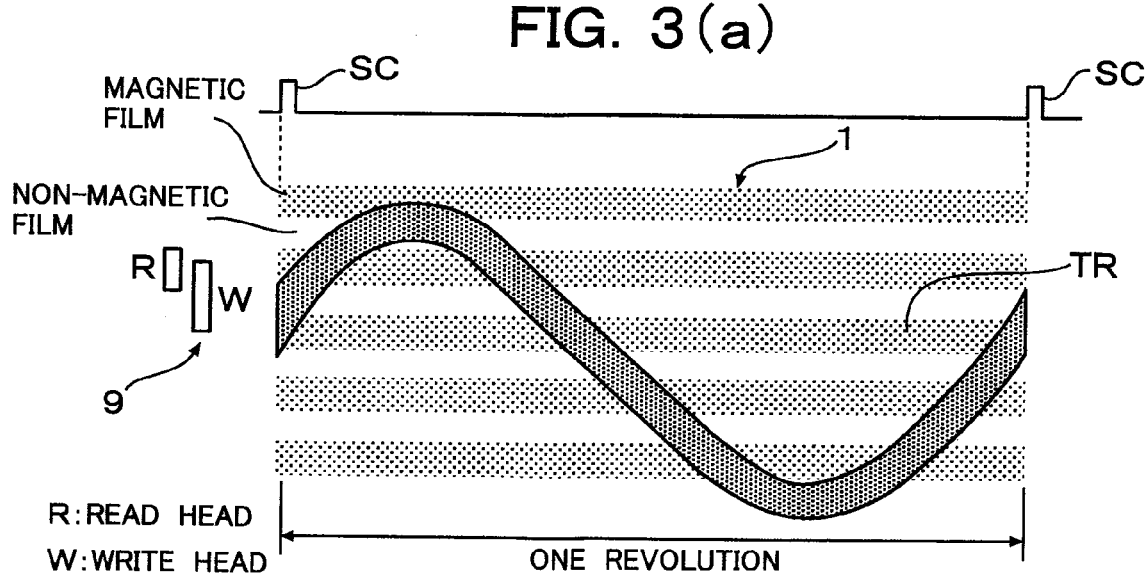
FIG. 3(a) shows a locus when a test data eccentric with respect to tracks of a DTM.

With the moving distance r [mm] in the radial direction set in the register, the X stage 3a is driven by the head access control circuit 16 to move the head 9 from a reference point or a certain designated track position to an aimed position by roughly r [mm] and, then, the piezo stage 4 is driven to finely move the head 9 toward the designated track. Thus, the head 9 is positioned at the center of the aimed track TR (refer to FIG. 3(a)) (Step 101).

The MPU 21 drives the piezo actuators 5 and 7 to position the head 9 in the aimed track TR under the ON track servo control by referring the normalizing POS voltage table 22c, setting a normalized value for ON track servo positioning in the aimed track TR in the normalizing value register 111a and activating the servo positioning control circuit 11.

The servo positioning control circuit 11 drives the piezo actuators 5 and 7 to finely position the head 9 in an aimed track of the rotating DTM 1 by the piezo stage 4, dynamically. Thus, the head 9 is dynamically positioned in the aimed track position of the rotating DTM 1 corresponding to the normalizing value, highly precisely.

Incidentally, the switching circuit 111d in this case has selected the normalizing value register 111a.

Then, the MPU 21 calls and executes the data eccentrical write program 22b and selects the head eccentric driving by switching the switching circuit 111d to the sine-wave data generator circuit 111d (Step 103). Then, the write is started in response to a generation of the sector signal SC (refer to FIG.

3(*a*)) of the write start signal to add an eccentricity to the head 9 and writes the test data for one revolution in the aimed track TR under the ON track servo control (Step 104).

Figure 3B:
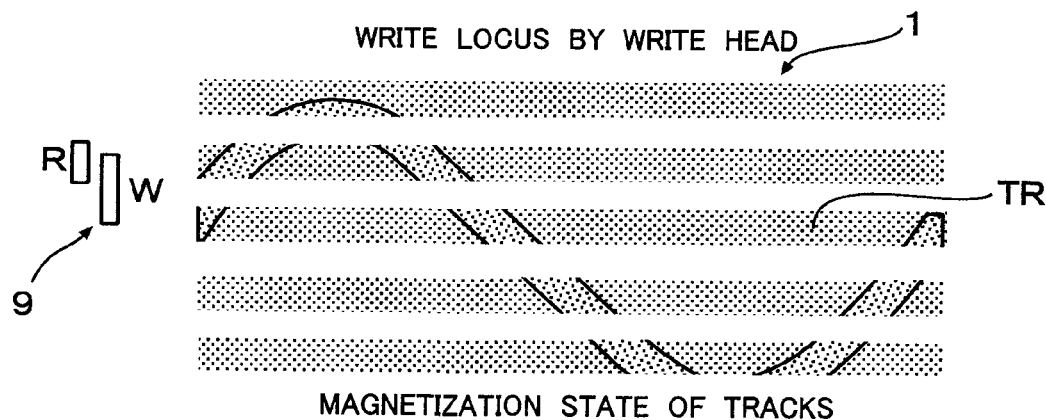
FIG. 3(b) shows a locus when the test data eccentric with respect to the DTM is read out.

FIG. 3(*a*) shows the recording state of a plurality of tracks including the aimed track TR by the head eccentric driving. In FIG. 3(*a*), the tracks on the DTM 1 become relatively pseudo-eccentric by the driving for forcibly making the head 9 eccentric with respect to a track and the test data is written in sine-wave with the aimed track TR as a center.

SC shown in FIG. 3(*a*) is the sector signal which becomes the write start signal. In Step 104, the MPU 21 starts the writing of the test data in synchronism with the sector signal SC and writes the test data TD, which is eccentric with respect to the aimed track TR, in a plurality of tracks in front of and afbehind the aimed track TR as shown in FIG. 3(*a*).

Incidentally, instead of the sector signal, an index signal IND may be used as the write start signal.

After the writing of the test data TD is ended, the MPU 21 calls the test data eccentric read program 22*c* to record the test data along the locus of the recorded test data by moving the read head (MR head) in the radial direction of the DTM 1.

That is, the MPU 21 executes the test data eccentric read program 22*c* to write the normalized data, which moves from the position of the aimed track TR in the radial direction by −D [nm], in the radial direction in the normalization value register 111*a* by the head 9 (Step 105).

When the data of the moving distance −D [nm] in the radial distance is set in the normalized value register 111*a*, the piezo actuators 5 and 7 are driven to shift the head 9 to the position in front of D [nm] of the aimed track TR and then the MPU 21 switches the switching circuit 111*d* to the sine-wave data generator circuit 111*c* (Step 106). Therefore, the MPU 21 enters into the test data read processing for moving the head forward in the radial direction by performing the ON track servo control for making the test data eccentric with using the shifted position as a reference (Step 107).

In this reading processing, the MPU 21 enters first into the processing in the Step 107*b*, eccentrically drives the head 9 in the shifted point in response to the generation of the section signal SC (refer to FIG. 3(*a*)) of the write start signal to read the test data for one revolution of the track, calculates an average value for one revolution of the read signal voltage and stores the average value in the memory 22 corresponding to the moving direction of the head in the radial direction (Step 107*c*).

Thereafter, the MPU 21 performs the head shifting for moving the head 9 in the radial direction by +Δd [nm] with respect to the data in the normalized value register 111*a* (Step 107*a*), a calculation processing for calculating the average value for one revolution of the read signal voltage by eccentrically driving the head 9 (Step 107*b*) and the storing processing for storing an average value for one revolution value corresponding to the moving distance of the head in the radial direction in a designated area of the memory 22, repeatedly (Step 107*c*). As the result of this read processing, the read of the test signal for one revolution is repeated by seeking the head 9 in the radial direction from in front of the aimed track TR to behind the aimed track TR to thereby the read of the test data covering all of the recorded locus of the test data shown in FIG. 3(*b*).

In a case where the head 9 is eccentrically driven under the ON track servo control, it is possible to trace the eccentric test data by the head 9 (MR head) by moving the head 9 in the radial direction of the DTM 1 by −D [nm].

As shown in FIG. 3(*a*), the eccentricity of the DTM 1 is in the order of 5 tracks in the locus of the test data. However, when the MR head is moved along the serpentine track locus during the write of the test data in the radial direction every track revolution and the read of the recorded test data is performed from a position immediately before the aimed track to a position immediately after the aimed track, the write sensitive widths in the reading locus in the aimed track are sequentially traced by the MR head regardless of the eccentricity, similarly to the conventional acquisition of the read characteristics profile, though the recording test data is spread and sectioned over a plurality of tracks. Further, the range of the write sensitive width of the write head is completely covered by the read head, theoretically.

As a result, the MPU 21 can acquire the read characteristics profile 12, which has a peak read voltage for the moving distance of the head 9 in the radial direction as shown in FIG. 4. Incidentally, black pointed positions are the measuring points. The abscissa shows the moving distance of the head 9 in the radial direction and the ordinate shows a ratio of the read voltage with respect to the maximum read voltage value of 1.0.

Therefore, the MPU 21 generates the read characteristics profile 12 (shown by a solid line) having the read voltage peak of the moving distance of the head 9 (the MR head) by executing the read characteristics profile program 22*a* on the basis of the average value obtained for the moving distance of the head 9, which is recorded in the step 107*c*, and interpolating the measuring points of the moving distance in the radial direction (Step 108).

Then, the MPU 21 detects a level of the read signal at the peak point of the read characteristics profile 12 (Step 109).

Then, the MPU 21 converts the read voltage of the measured value to a ratio with respect to the peak value (maximum voltage value) which is 1.0. The level of the read signal at the peak point is set as 100% and the moving distance (abscissa) of the head 9 (write head) in the radial direction corresponding to the 50% read signal level is calculated as the write sensitive width Wa and stores it in a designated area of the memory 22 (Step 110).

Figure 7:
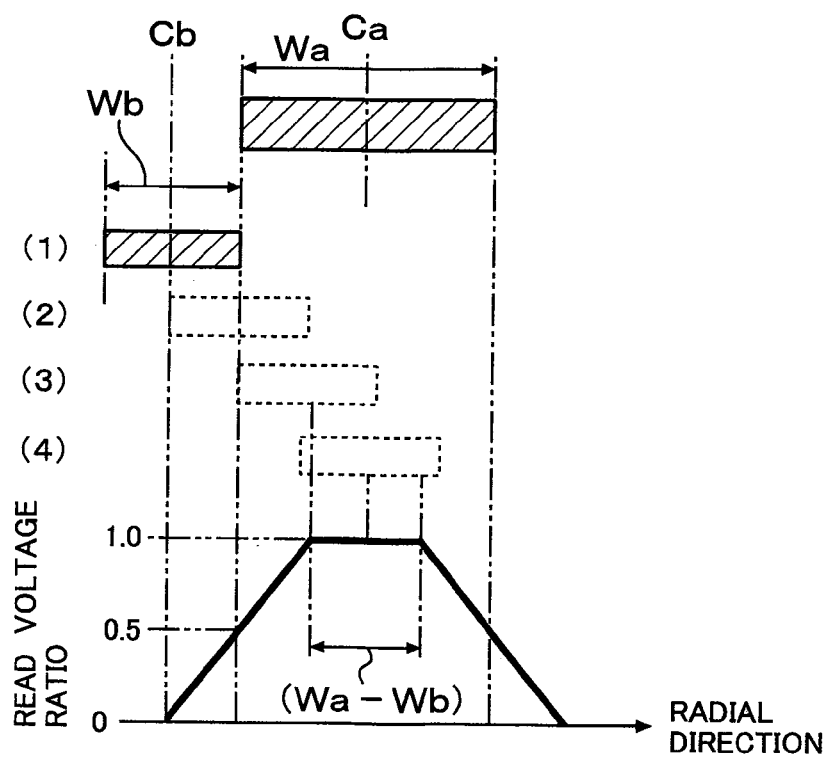
FIG. 7 shows a conventional measuring method for measuring a write sensitive width of a head and a read sensitive width of an MR head as characteristics parameters of a magnetic head.

The thus obtained read characteristics profile shown in FIG. 4 has the flat portion in the center portion unlike the conventional waveform shown in FIG. 7. However, since there is the relation [sensitivity width of MR head]<[write sensitive width of the write head] in the present invention and the practical sensitive width of the MR head (read head) is smaller than the track width (width of the track locus in the radial direction) in the recorded locus, there may be some read area (flat portion) in the radial direction in which the sensitive width of the MR head is in the write sensitive width during the movement of the head in the track width direction.

It is considered that the characteristics including a peak and substantially no flat portion such as shown by the read characteristics profile 12 is caused by that the track width and the width of the MR head are similar and that the MR head can not read an enough test data because the read of the MR head is performed with respect to the sectioned magnetization state.

Therefore, a profile 13, which approximates to the conventional read characteristics having a flat portion in the center top portion, is obtained from the curved lines on both sides in the read characteristics profile 12 shown in FIG. 4 (Step 111).

That is, the MPU 21 calls and executes a profile generation program 22*d* for generating a profile, which approximates to the read characteristics, after the execution of the read characteristics profile acquiring program 22*c* is ended. The MPU 21 generates the profile 13 by obtaining tangential lines S1 and S2 corresponding to the curved lines between slice levels assigned to the both side curved lines, for example, the curved lines between the slice levels 20% and 80% and replacing the both side curved lines of the read characteristics profile 12 by the tangential lines S1 and S2.

The MPU 21 calculates the read sensitive width Wb of he MR head from Wb=(B−C)/2 by setting points B1 and B2 at which the tangential lines S1 and S2 intersect the 0% level line (abscissa) and points C1 and C2 at which the tangential lines S1 and S2 intersect the 100% level line and obtaining these points from the coordinates of the radial direction (Step 112) as a moving distance B of the head 9 in the radial direction between the points B1 and B2 and as a moving distance C of the head 9 in the radial direction between the points C1 and C2 (Step 113).

The distance (B−C) in the approximate profile 13 of the read characteristics is a sum of inclined portions in the opposite end portions of this waveform in the radial direction. As described in FIG. 7, an inclined portion on the left side is a moving distance of the MR head in the radial direction from a time when the MR head enters into the write area of the test data to a time when it enters into the write area completely. This distance corresponds to the read width Wb of the MR head. The inclined portion on the right side in FIG. 7 is a moving distance of the MR head in the radial direction from a time when the MR head exits from the write area of the test data to a time when the MR head exits from the write area completely. This distance corresponds to the read width Wb of the MR head too.

Figure 6:
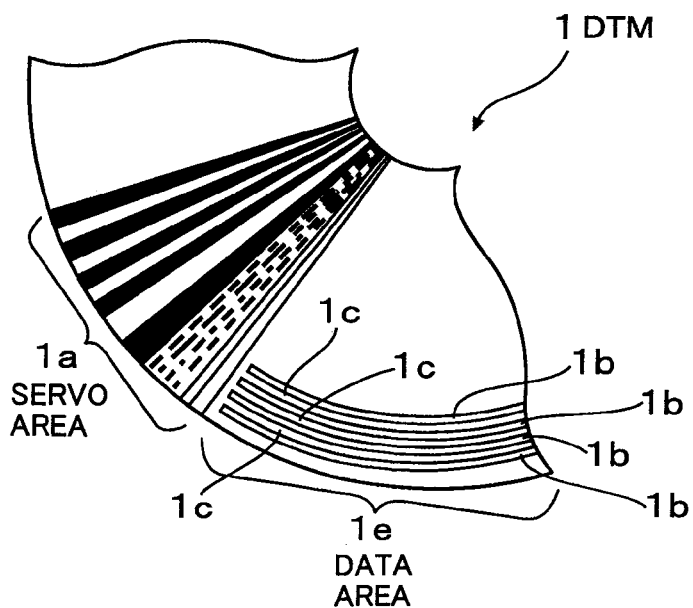
FIG. 6 shows a portion of tracks of a discrete track medium (DTM) accessed by a magnetic head to be tested.

The read relation of the curved lines on the both sides of the test data obtained by the read head is the same as the relation when the conventional read voltage profile shown in FIG. 6. Therefore, the approximate profile 13 of the read characteristics, which is obtained by replacing the curved lines on the both sides with the tangential lines S1 and S2, has the characteristics close to the conventional read characteristics.

Since such the inclined portions exist in the front and rear sides, the average value is obtained by (B−C)/2 as the read sensitive width Wb.

Incidentally, in the read characteristics profile 13 shown in FIG. 4, the abscissa is the moving distance of the head 9 in the radial direction. In Step 106, the movement of the head 9 is started at the position D[nm] before the aimed track. Therefore, the position of the distance D[nm] from the original point of the abscissa in FIG. 4 becomes the position at which the head 9 is positioned by the aimed track position and the test data is written by the write head. This position also corresponds to the position at which the head 9 is positioned in the aimed track and the read head reads the test data. Therefore, a distance OF in the radial direction from this position to a position at which the read head reads the peak voltage is the distance of the gap between the write head and the read head, that is, the offset amount of the write head and the read head.

Therefore, it is possible to provide a step for calculating the offset amount in the data of the read characteristics approximating profile 12 or 13 shown in FIG. 4, next to Step 113. Incidentally, the position of the peak point in the read characteristics approximating profile 13 is the center value of the flat portion.

In the case mentioned above, the tangential lines S1 and S2 with respect to the curved lines on the both sides of the read characteristics approximating profile 13 are to obtain linear lines approximating to the curved lines on the both sides. Therefore, in lieu of the acquisition of the tangential lines, it is possible to obtain the approximate linear lines on the both sides by approximating the curved lines between 20% and 80% or by applying the least squares method to the measuring values in this range.

Further, the calculation of the write sensitive width Wa in Step 113 may be performed together with the calculation of the read sensitive width Wb in not the read characteristics profile 12 but the read characteristics approximating profile 13.

Further, the slice levels 20% and 80% for determining the range of the curved lines on the both sides of the read characteristics approximate profile 13 are a mere example. In this invention, it is enough to obtain the approximate linear lines in the range of the curved lines including the measuring values near 50% and the range is not limited to from 20% to 80%. The reason for inclusion of the curved lines of the measuring value of around 50% is that, since a half of the MR head enters in the write area of the test data in this range, the test data is read without substantial influence of the around recording state. Further, in this state, the relation between the MR head and the recorded information is close to the relation when the conventional read characteristics of the magnetic head is obtained though the recording state of the test data is fragmentary.

In the described embodiment, when the test data is read, the read head is moved from the front of the aimed track in the radial direction and crosses the track, in which the test data is written, till the rear side. However, in this case, it is of course possible to move the read head from the rear of the aimed track in the radial direction and to cross the track, in which the test data is written, till the front side.

Further, the eccentricity of the DMT 1 in this embodiment is a mere example. When the DTM 1 is mounted on a spindle with eccentricity with which 2 or more tracks are accessed in one revolution, it is possible to measure the write sensitive width of the write head and the read sensitive width of the read head. The reason for this is that, since the write sensitive width is within a range of 1 track or a range which does not cover 2 tracks, it is possible to obtain the track locus corresponding to the write sensitive width by accessing the 2 tracks or more in even fragmented DTM or BPM.

In the described embodiment, it is not always necessary to move the head from front of to behind the designated track. The head may be moved after to before the track by setting data in the moving distance +D [nm] and moving by −Δd. Further, the discrete track medium (DTM) in the embodiment is a mere example and it is of cause possible to apply this invention to the bit pattern medium (BPM).

The invention claimed is:

1. A measuring method for measuring a write width and/or a read width of a composite magnetic head having a write head and a read head by obtaining a read characteristics of the composite magnetic head, comprising the steps of writing test data over at least two tracks corresponding to an eccentricity by the write head by positioning the composite magnetic head under an ON track servo control by reading a servo information from a designated track of a rotating magnetic recording medium of a discrete track system, a rotating magnetic recording medium of a bit pattern system or a rotating magnetic recording medium having other uneven recording layer and driving the composite magnetic head by giving the eccentricity for accessing at least two tracks for one revolution to the composite magnetic head, reading the test data in the at least two tracks by the read head under the ON track servo control while rotating the magnetic recording medium and moving the composite magnetic head in the radial direction by a pitch smaller than a distance between the two tracks by the one revolution from before the designated track to after or vice versa to cover an area in which the test data is written by the writing, and calculating the write sensitive width or the read sensitive width by obtaining a read characteristics profile having a peak of a read voltage for the moving distance of the composite magnetic head in the radial direction on the basis of the read signal of the read head.

2. A measuring method for measuring a write width and/or a read width of a composite magnetic head as claimed in claim 1, wherein the write head enters into the writing of the test data in response to a sector signal or an index signal.

3. A measuring method for measuring a write width and/or a read width of a composite magnetic head as claimed in claim 2, wherein approximate linear lines of both sides of the peak of the read characteristics profile are obtained from curved portions of the both sides of the peak, a read characteristics approximate profile having a flat portion in an upper portion of the read characteristics profile is obtained on the basis of the approximate linear lines of the both sides and the read sensitive width is calculated on the basis of the read characteristics approximate profile.

4. A measuring method for measuring a write width and/or a read width of a composite magnetic head as claimed in claim 3, wherein the write sensitive width is calculated on the basis of the read characteristics approximate profile.

5. A measuring method for measuring a write width and/or a read width of a composite magnetic head as claimed in claim 4, wherein said magnetic recording medium is of the discrete track type and a track width is equal to or narrower than the write sensitive width of the write head.

6. A measuring method for measuring a write width and/or a read width of a composite magnetic head as claimed in claim 5, wherein said read head and said write head of said composite magnetic head are an MR head and a thin film inductive head, respectively, the approximate linear lines are calculated by calculation of tangential lines, a linear approximation or approximation by minimum square method for curved portions of the both sides of the read characteristics profile including read level of 50% of the maximum read level.

7. A measuring method for measuring a write width and/or a read width of a composite magnetic head as claimed in claim 6, wherein a read voltage of the read characteristics profile is an average value of the read signal voltage for one revolution and the approximate linear lines are calculated on the basis of the curves portions of the both sides in a read level range from 20% to 80% of the maximum read level.

8. A measuring method for measuring a write width and/or a read width of a composite magnetic head as claimed in claim 3, wherein the read sensitive width of said MR head is calculated by (B−C)/2, where B is a moving distance of the composite magnetic head in a radial direction between a point B1 and a point B2 which are intersection points of the approximate linear line on the both sides and a line of read level 0% of the read characteristics profile and C is a moving distance of said composite magnetic head in a radial direction between a point C1 and a point C2 which are intersection points of the approximate linear line on the both sides and a line of red level of 100% of said read characteristics profile.

9. A measuring method for measuring a write width and/or a read width of a composite magnetic head as claimed in claim 3, wherein a distance from a position of the read characteristics profile corresponding to the position of said composite magnetic head when it is positioned in the designated track to the peak position in the radial direction is further calculated as an offset amount of said read head and said write head.

10. A measuring method for measuring a write width and/or a read width of a composite magnetic head as claimed in claim 1, wherein a distance from a position of the read characteristics profile corresponding to the position of said MR head when it is positioned in a designated track to the peak position in the radial direction is further calculated as an offset amount of said read head and said write head.

11. A write width/read width measuring device for measuring a write sensitive width and/or a read sensitive width by obtaining a read characteristics profile of a composite magnetic head having a write head and a read head, comprising a spindle for rotating a magnetic recording medium of a discrete track system, a magnetic recording medium of a bit pattern system or a magnetic recording medium having other uneven recording layer, a servo control circuit for performing ON track servo control for reading a servo information from a designated track of the rotating magnetic recording medium, eccentric driving means for giving an eccentricity for accessing at least two tracks for one revolution to the magnetic recording medium in the radial direction by positioning the composite in the designated track under the ON track servo control, test data writing means for writing the test data over at least two tracks by the write head of the composite magnetic head while rotating the magnetic recording medium by the spindle by one revolution, head moving means for moving the composite magnetic head in radial direction in front of the designated track to behind the designated track or vice versa, test data read means for reading the test data written over the at least two tracks by the read head of the composite magnetic head while rotating the magnetic recording medium by the spindle and moving a position of the read head in the radial direction by the head moving means by a pitch smaller than a distance between the two tracks by the one revolution to cover an area in which the test data is written by the test data writing means, and read characteristics profile generation means for generating a read characteristics profile having a peak of a read voltage corresponding to the moving distance of the composite magnetic head on the basis of the read signal of the read head.

12. A write width and/or a read width measuring device claimed in claim 11, further comprising a read characteristics approximate profile obtaining means, wherein the read characteristics approximate profile obtaining means obtains approximate linear lines of both sides of the peak of the read characteristics profile from curved portions of the both sides of the peak and a read characteristics approximate profile having a flat portion in an upper portion of the read characteristics profile on the basis of the approximate linear lines of the both sides, and the read sensitive width is calculated on the basis of the read characteristics approximate profile.

13. A write width and/or a read width measuring device claimed in claim 12, wherein the write sensitive width is calculated on the basis of the read characteristics profile.

14. A write width and/or a read width measuring device claimed in claim 13, wherein the magnetic recording medium is of the discrete track system and a track width is equal to or narrower than the write sensitive width of the write head.

* * * * *